(12) United States Patent
Foreman

(10) Patent No.: US 8,544,807 B2
(45) Date of Patent: Oct. 1, 2013

(54) APPARATUS FOR MOUNTING A SURVEILLANCE CAMERA

(75) Inventor: William L. Foreman, Fresno, CA (US)

(73) Assignee: Pelco, Inc., Clovis, CA (US)

( * ) Notice: Subject to any disclaimer, the term of this patent is extended or adjusted under 35 U.S.C. 154(b) by 1202 days.

(21) Appl. No.: 12/221,126

(22) Filed: Jul. 30, 2008

(65) Prior Publication Data

US 2010/0025554 A1 Feb. 4, 2010

(51) Int. Cl.
*B42F 13/00* (2006.01)

(52) U.S. Cl.
USPC ........... 248/343; 248/317; 248/323; 248/342; 248/244; 248/222.11; 348/151; 362/365

(58) Field of Classification Search
USPC ................ 348/151; 362/365; 248/343, 317, 248/323, 342, 244, 222.11
See application file for complete search history.

(56) References Cited

U.S. PATENT DOCUMENTS

| | | | | |
|---|---|---|---|---|
| 3,590,137 A * | 6/1971 | Librandi | ......................... | 174/58 |
| 3,620,401 A * | 11/1971 | Lund | ............................... | 220/3.6 |
| 4,086,480 A * | 4/1978 | Lahm | ........................... | 362/148 |
| 4,733,339 A * | 3/1988 | Kelsall | ......................... | 362/366 |
| 4,739,460 A * | 4/1988 | Kelsall | ......................... | 362/365 |
| 5,077,650 A * | 12/1991 | Cestari | ......................... | 362/365 |
| 5,609,414 A * | 3/1997 | Caluori | ......................... | 362/366 |
| 5,655,865 A * | 8/1997 | Plank et al. | ..................... | 411/85 |
| 5,725,302 A * | 3/1998 | Sirkin | ........................... | 362/365 |
| 5,931,432 A * | 8/1999 | Herold et al. | ................. | 248/343 |
| 5,941,625 A * | 8/1999 | Morand | ........................ | 362/148 |
| 5,967,646 A * | 10/1999 | Engel | ....................... | 362/296.03 |
| 6,000,818 A * | 12/1999 | Caluori | ......................... | 362/365 |
| 6,168,298 B1 * | 1/2001 | Hentz et al. | ................... | 362/365 |
| 6,364,511 B1 * | 4/2002 | Cohen | .......................... | 362/368 |
| 6,896,394 B2 * | 5/2005 | Houle | ........................... | 362/365 |
| 7,129,411 B2 * | 10/2006 | Bump et al. | .................... | 174/58 |
| 2008/0232116 A1 * | 9/2008 | Kim | ............................... | 362/365 |

* cited by examiner

*Primary Examiner* — Waseem Ashraf
(74) *Attorney, Agent, or Firm* — Hamilton Brook Smith & Reynolds, P.C.

(57) ABSTRACT

An apparatus for mounting a recessed electric fixture in a hole in a support surface having a housing and flexible member with attached spring clips to secure the housing against the support surface is disclosed. The flexible member and spring clips are attached to the recessed electric fixture by tightening members, and inward pressure applied to the tightening members causes the flexible member to bend so that the spring clips are moved inwardly towards the housing, allowing the spring clips and the flexible member to pass through the hole in the support surface. The flexible member unbends when the pressure on the tightening members is removed, allowing the spring cops to move outwardly from the housing so that a surface-bearing section of the spring clips bears against the back side of the support surface and retains the electric fixture in the support surface hole.

8 Claims, 4 Drawing Sheets

APPARATUS FOR MOUNTING A SURVEILLANCE CAMERA

CROSS-REFERENCE TO RELATED APPLICATION

N/A

STATEMENT REGARDING FEDERALLY SPONSORED RESEARCH OR DEVELOPMENT

N/A

BACKGROUND OF THE INVENTION

This invention relates generally to surveillance systems and, in particular, to an assembly for mounting video cameras.

Surveillance system cameras have been installed in many different environments. When the installation has required a recessed mount, the cameras have been installed in recessed-mounted canisters (commonly called "back boxes" in the industry). The back boxes are typically attached by screws, bolts and so forth directly to structural elements, such as beams and joists, that are located above or behind the ceiling or wall to which the camera is to be mounted. This type of mounting requires access to the structural elements, which is frequently not available and requires that the structural elements be located at an appropriate distance from the ceiling or wall to accommodate the size of the back box.

U.S. Pat. No. 5,931,432 pertains to an improved mounting assembly for applications where the back box is mounted to a ceiling, such as with a suspended ceiling, or hollow wall rather than to a structural element. This improved mounting assembly incorporates spring clips that are attached to back box so that the back box can be attached to the ceiling or wall rather than a structural element.

Although the mounting assembly disclosed in U.S. Pat. No. 5,931,432 was a significant improvement over the prior art in providing a method to attach a surveillance camera to a ceiling or wall, it requires the additional expense of a back box and the installation of the camera wiring through the back box. Accordingly, the industry has felt a need for a mounting assembly that allows a surveillance camera to be easily and securely installed in a hole in a support surface, such as a suspended ceiling or hollow wall, without the additional expense and installation requirements of a back box.

SUMMARY OF THE INVENTION

In accordance with the present invention there is provided an apparatus for mounting a recessed electric fixture in a hole in a support surface having a front side and a back side, the electric fixture having a housing and a flange perpendicular to the housing with apertures adapted to receive a tightening member. The apparatus comprises a flexible member having first and second ends, a first spring clip attached to the first end of the flexible member, and a second spring clip attached to the second end of the flexible member. The first and second spring clips have a tightening section for receiving a tightening member, a surface-bearing section for bearing against the back side of the support surface, and a connecting section connecting the tightening section and the surface-bearing section, whereby when tightening members are inserted through the apertures in the flange and received in the threaded section of the first and second spring clips, pressure applied to the tightening members causes the flexible member to bend so that the first and second spring clips are moved inwardly towards the center of the housing so that the first and second spring clips and the flexible member can pass through the hole and whereby the flexible member unbends when the pressure on the tightening members is removed causing the first and spring clips to move outwardly away from the center of the housing so the surface-bearing section bears against the back side of the support surface to retain the electric fixture in the support surface hole.

In another aspect of the present invention there is provided a recessed surveillance camera for mounting in a hole in a support surface having a front side and a back side. The surveillance camera comprises a housing with an annular flange perpendicular to the housing portion, the flange having apertures for receiving tightening members, and a mounting assembly. The mounting assembly comprises a flexible member having first and second ends, a first spring clip attached to the first end of the flexible member, and a second spring clip attached to the second end of the flexible member. The first and second spring clips have a tightening section for receiving a tightening member, a surface-bearing section for bearing against the back side of the support surface, and a connecting section connecting the tightening section and the surface-bearing section, whereby when tightening members are inserted through the apertures in the flange and received in the threaded section of the first and second spring clips, pressure applied to the tightening members causes the flexible member to bend so that the first and second spring clips are moved inwardly towards the center of the housing so that the mounting assembly can pass through the hole and whereby the flexible member unbends when the pressure on the tightening members is removed causing the first and second spring clips to move outwardly away from the center of the housing so the surface-bearing section bears against the back side of the support surface to retain said surveillance camera in the support surface hole.

The mounting assembly of the present invention allows a recessed surveillance camera or other recessed electric fixture to be easily and securely installed in a hole in a support surface, such as a suspended ceiling or hollow wall, without the additional expense and installation requirements of a back box. When installed on a surveillance camera or other electric fixture by tightening members, such as screws, the mounting assembly of the present invention enables a user to insert the mounting assembly into the hole by applying pressure to the tightening members which causes the flexible member of the mounting assembly to bend so that the mounting assembly is easily and quickly installed into through the hole in the mounting surface. When a user removes the pressure from the tightening members, the flexible member unbends thereby causing the spring clips to move outwardly away from the center of the housing so that the spring clips support the camera on the back side of the supporting surface. The flexible member prevents the spring clips from rotating when a user tightens the tightening members drawing the camera to the front side of the mounting surface and the surface-bearing section of the spring clips to the back side of the mounting surface.

DETAILED DESCRIPTION OF THE INVENTION

Figure 1:
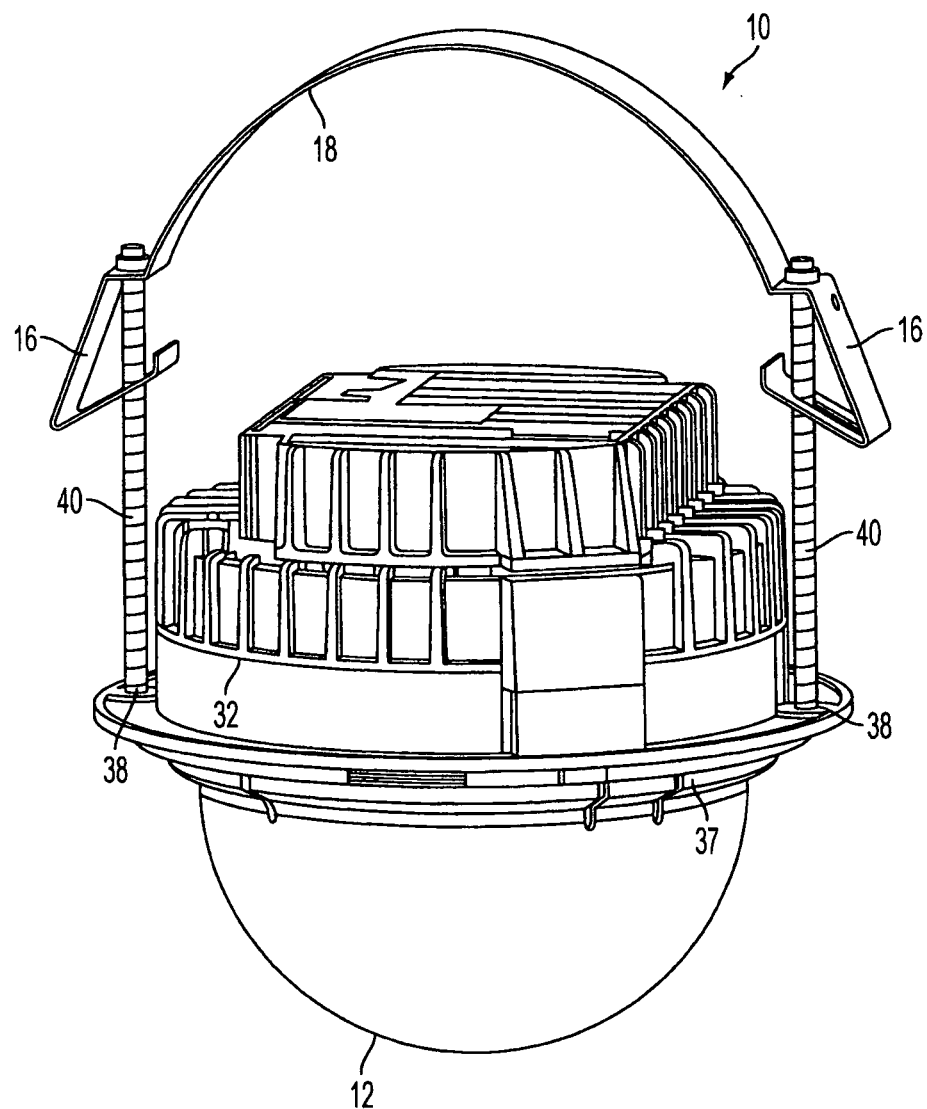
FIG. 1 is a perspective view of one embodiment of a mounting assembly according to the present invention attached to a surveillance camera.

Referring to FIGS. 1-4, in which like parts have been labeled with like numerals, a mounting assembly 10 for mounting a surveillance camera 12 to a support surface 14, such as a suspended ceiling or hollow wall, according to the present invention is disclosed. Mounting assembly 10 has two spring clips 16, which are connected to opposite ends of flexible member 18. Flexible member 18 is stiff enough to prevent spring clips 16 from rotating while allowing each spring clip 16 position to be independently adjusted both horizontally and vertically. The installation and operation of mounting assembly 10 utilizing the foregoing features will described below in detail. Flexible member 18 can be made of a strip of polypropylene, such as FORMEX GK-30 available from Fabri-Tech Components Inc. located in Fremont, Calif. or other suitable material. Spring clips 16 can be connected to flexible member 18 by various methods such as gluing, bonding, or multiple fasteners.

Each spring clip 16 has a bearing tab 20 which is connected by a connecting arm 22 to a threaded tab 24 containing screw threads indicated by numeral 26. Bearing tab 20 also includes a slot 28 and a skid tab 30. Spring clip 16 can be made of a spring steel material that is resilient so that spring clip 16 can be slightly compressed and then approximately assume its original position when the compression force is removed. Slot 28 is elongated for the purpose of permitting connecting arm 22 to flex inwardly towards housing 32 of surveillance camera 12, if necessary, during insertion of mount assembly 10 and housing 32 into hole 34 in support surface 14 and outwardly away from housing 32 in a manner to permit bearing tab 20 to flatten out against back side 36 of supporting surface 14 adjacent hole 34 in order to retain surveillance camera 12 securely in position. Annular flange 37 of surveillance camera 12 is perpendicular to housing 32 and has an outside diameter that is greater than the diameter of hole 34. Annular flange 37 has two apertures 38 through which screws 40, are inserted. Screws 40 have threads that mate with threads 26 of threaded tab 24.

To install mounting assembly 10 and surveillance camera 12 in support surface 14, screws 40 are inserted through apertures 38 through slots 28 in spring clip 16 and then slightly screwed into threads 26. An installer then applies inward pressure to screws 40, as indicated by arrows 44, with one or more fingers to stabilize mounting assembly 10 and to cause flexible member 18 to flex or bend thereby causing spring clips 16 to move inwardly towards housing 32. The inward movement of spring clips 16 normally allows mounting assembly 10 to pass through hole 34 in support surface 14. In the event that hole 34 is sized such that connecting arms 22 of spring clip s 16 contact the inside wall of hole 34, then as described above, spring clips 16 will compress slightly with screws 40 moving inside slots 28 to allow spring clips to pass through hole 34. The installer then removes the inward pressure on screws 40 which in turn removes the pressure from flexible member 18 thereby allowing it move spring clips 16 outwardly from housing 32 so that bear tabs 26 come in contact with back side 36 of support surface 14.

Figure 3:
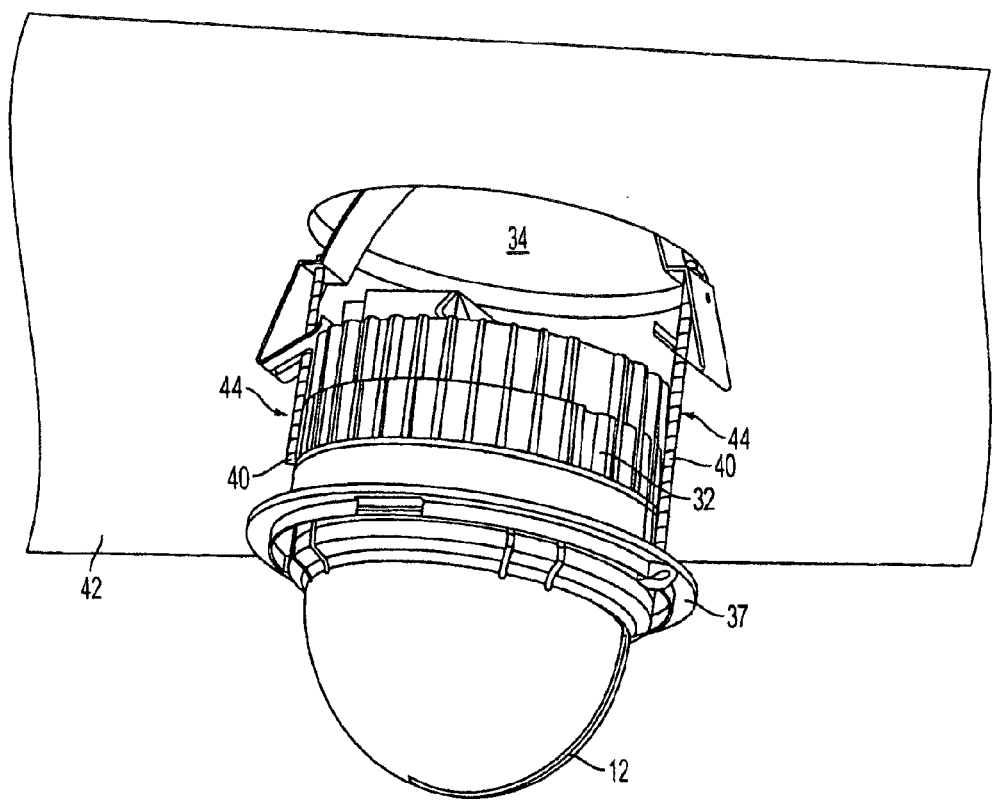
FIG. 3 is a perspective view illustrating the installation of the mounting assembly and surveillance camera according to the present invention.
Figure 4:
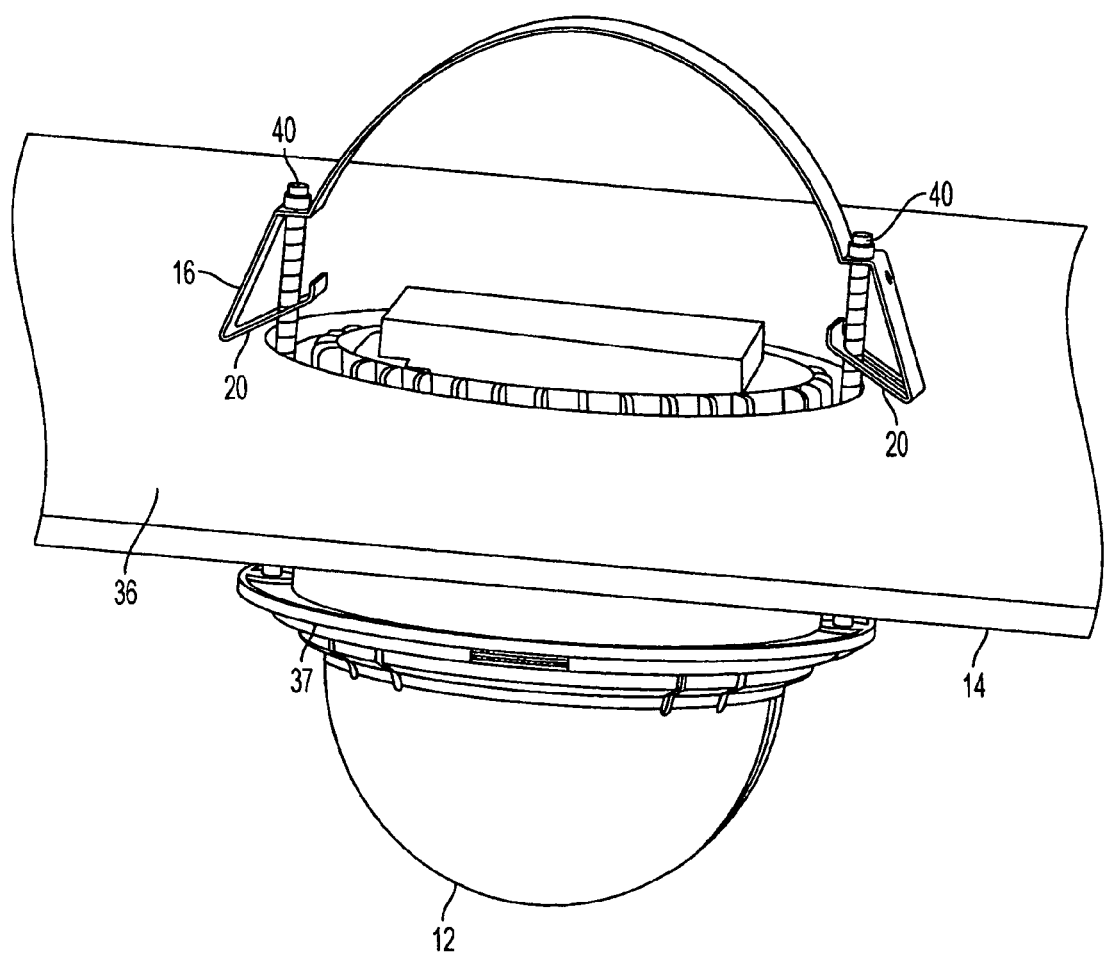
FIG. 4 is a perspective view illustrating the installation of the mounting assembly and surveillance camera according to the present invention.

At this point in the installation process, surveillance camera 12 is supported by mounting assembly 10 so that the installer does not have to hold surveillance camera 12. The installer then tightens screws 40 to move annular flange 37 into contact with front side 42 of support surface 14 and to bring bearing tab 20 in further contact with back side 36. Screws 40 are tightened until annular surface 40 is securely in contact with front side 42. During the screw tightening process, flexible member 18 prevents spring clips 16 from rotating. FIG. 3 shows mounting assembly 10 being inserted through hole 34, and FIG. 4 shows mounting assembly after it has been inserted through hole 34.

Figure 2:
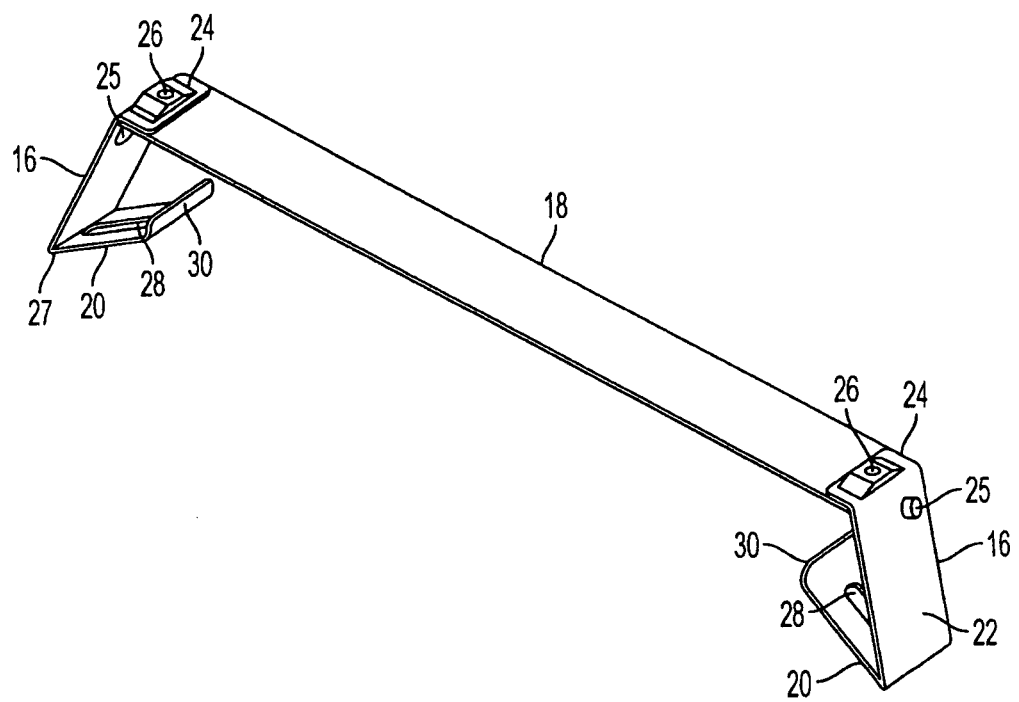
FIG. 2 is a perspective view of mounting assembly illustrated in FIG. 1.

FIG. 2 shows a preferred method of attachment of flexible member 18 to spring clips 16. Flexible member 18 is bent to match the angle formed by connecting arm 22 and screw tab 24. A single fastener 25 is used to attach flexible member 18 to connecting arm 22 and the end of flexible member 18 contacts spring clip 16 at point 27 which is the intersection of connecting arm 22 and bearing tab 20. The contact between the end of flexible member 18 and spring clip 16 at point 27 eliminates the need for a second fastener.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

What is claimed is:

1. An apparatus for mounting a recessed electric fixture in a hole in a support surface having a front side and a back side, the electric fixture having a housing and a flange perpendicular to the housing with apertures adapted to receive a tightening member, said apparatus comprising:

a flexible member having first and second ends and corresponding surfaces;

a first spring clip attached to said first end of said flexible member;

and a second spring clip attached to said second end of said flexible member;

said flexible member connected to said first and second spring clips by only a single fastener;

said first and second spring clips having a tightening section for receiving a tightening member, a surface-bearing section for bearing against the back side of the support surface, and a connecting section connecting the tightening section and the surface-bearing section at corresponding intersections, the corresponding surfaces of said first and second ends of said flexible member positioned against the intersection of said connecting section and said surface-bearing section, whereby when tightening members are inserted through the apertures in the flange and received in said threaded section of said first and second spring clips, inward pressure applied to the tightening members causes said flexible member to bend so that said first and second spring cups are moved inwardly towards the center of the housing so that said first and second spring clips and said flexible member can pass through the hole and whereby said flexible member unbends when the pressure on the tightening members is removed causing said first and second spring clips to move outwardly away from the center of the housing so said surface-bearing section bears against the back side of the support surface to retain the electric fixture in the support surface hole.

2. An apparatus as recited in claim 1, wherein said flexible member prevents said first and second spring clips from rotating when a tightening member is tightened into said tightening section.

3. An apparatus as recited in claim 1, wherein said surface-bearing section of said first and second spring clips has a slot sized to accommodate the tightening member and to allow the position of said surface-bearing section in relation to the tightening member to be changed.

4. An apparatus as recited in claim 1, wherein the tightening member is threaded and said tightening section is threaded to mate with said tightening member and the tightening of the tightening member draws the flange towards the front side of the support surface and said surface-bearing section against the back side of the support surface.

5. A recessed surveillance camera for mounting in a hole in a support surface having a front side and a back side, said surveillance camera comprising:

- a housing with an annular flange perpendicular to the housing portion, said flange having apertures for receiving tightening members;
- and a mounting assembly comprising a flexible member having first and second ends and corresponding surfaces,
- a first spring clip attached to said first end of said flexible member, and
- a second spring clip attached to said second end of said flexible member,
- said flexible member connected to said first and second spring clips by only a single fastener,
- said first and second spring clips having a tightening section for receiving a tightening member,
- a surface-bearing section for bearing against the back side of the support surface, and
- a connecting section connecting the tightening section and the surface-bearing section at corresponding intersections,
- the corresponding surfaces of said first and second ends of said flexible member positioned against the intersection of said connecting section and said surface-bearing section,
- whereby when tightening members are inserted through said apertures in said flange and received in said threaded section of said first and second spring clips,
- inward pressure applied to the tightening members causes said flexible member to bend so that said first and second spring clips are moved inwardly towards the center of said housing so that said mounting assembly can pass through the hole and
- whereby said flexible member unbends when the pressure on the tightening members is removed causing said first and second spring clips to move outwardly away from the center of said housing so said surface-bearing section bears against the back side of the support surface to retain said surveillance camera in the support surface hole.

6. A surveillance camera as recited in claim 5, wherein said flexible member prevents said first and second spring clips from rotating when a tightening member is tightened into said tightening section.

7. A surveillance camera as recited in claim 5, wherein said surface-bearing section of said first and second spring clips has a slot sized to accommodate the tightening member and to allow the position of said surface-bearing section in relation to the tightening member to be changed.

8. A surveillance camera as recited in claim 5, wherein the tightening member is threaded and said tightening section is threaded to mate with said tightening member and the tightening of the tightening member draws the flange towards the front side of the support surface and said surface-bearing section against the back side of the support surface.

* * * * *

UNITED STATES PATENT AND TRADEMARK OFFICE
CERTIFICATE OF CORRECTION

| | | |
|---|---|---|
| PATENT NO. | : 8,544,807 B2 | Page 1 of 1 |
| APPLICATION NO. | : 12/221126 | |
| DATED | : October 1, 2013 | |
| INVENTOR(S) | : William L. Foreman | |

It is certified that error appears in the above-identified patent and that said Letters Patent is hereby corrected as shown below:

In the Claims

Claim 1, Column 4, Line 59, delete "cups" and insert --clips--.

Signed and Sealed this
Twenty-fifth Day of February, 2014

Michelle K. Lee
*Deputy Director of the United States Patent and Trademark Office*